(12) United States Patent
Bonk et al.

(10) Patent No.: US 8,503,484 B2
(45) Date of Patent: Aug. 6, 2013

(54) SYSTEM AND METHOD FOR A CROSS CHANNEL DATA LINK

(75) Inventors: Ted Bonk, Cave Creek, AZ (US); William Todd Smithgall, League City, TX (US); Mitch Fletcher, Glendale, AZ (US); Greg Carlucci, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 325 days.

(21) Appl. No.: 12/355,892

(22) Filed: Jan. 19, 2009

(65) Prior Publication Data

US 2010/0183016 A1    Jul. 22, 2010

(51) Int. Cl.
    *G06F 11/00*    (2006.01)
(52) U.S. Cl.
    USPC .......................................... 370/503; 714/798
(58) Field of Classification Search
    USPC .. 370/400, 401, 463, 503, 509–511; 714/1–5, 714/798, 799; 701/224, 230, 234, 235, 238
    See application file for complete search history.

(56) References Cited

U.S. PATENT DOCUMENTS

| | | | |
|---|---|---|---|
| 4,356,546 A * | 10/1982 | Whiteside et al. ............. | 714/10 |
| 5,396,357 A | 3/1995 | Goossen et al. | |
| 7,096,285 B2 * | 8/2006 | Ellerbrock et al. ............. | 710/69 |
| 7,839,868 B2 * | 11/2010 | Kopetz ........................... | 370/401 |
| 2005/0117596 A1 | 6/2005 | Kopetz | |
| 2006/0043242 A1 * | 3/2006 | Benson .......................... | 244/175 |
| 2006/0179338 A1 * | 8/2006 | Sumner .......................... | 713/375 |
| 2008/0205416 A1 * | 8/2008 | DeChiara ....................... | 370/401 |
| 2009/0031198 A1 * | 1/2009 | Johansson ...................... | 714/799 |

OTHER PUBLICATIONS

Hermann Kopetz, The Time-Triggered Ethernet (TTE) Design, IEEE, Eighth Edition, 1-12.*
Hermann Kopetz, The Time-Triggered Ethernet (TTE) Design, May 2005, IEEE, pp. 1-12.*
Klaus Steinhammer, A Time-Triggered Ethernet (TTE) Switch, IEEE, Mar. 2006, pp. 1-6.*
Ademaj, Astrit and Hermann Kopetz, "Time-Triggered Ethernet and IEEE 1588 Clock Synchronization", " Precision Clock Synchronization for Measurement, Control and Communication, 2007. ISPCS 2007. IEEE International Symposium on", Oct. 1-3, 2007, pp. 41-43, Publisher: IEEE, Published in: Vienna.

(Continued)

*Primary Examiner* — Michael Thier
*Assistant Examiner* — Prince A Mensah
(74) *Attorney, Agent, or Firm* — Ingrassia Fisher & Lorenz, P.C.

(57) ABSTRACT

A node comprises a host computer operable to execute application tasks and to transmit data; a local time-triggered Ethernet switch operable to enforce temporal constraints on time-triggered data; and a time-triggered Ethernet controller coupled to the local time-triggered Ethernet switch and operable to be coupled to a time-triggered Ethernet switch in each of a plurality of other control nodes. The time-triggered Ethernet controller is further operable to communicate with the plurality of other control nodes to synchronize a local clock to establish a global time base and to provide a signal to the host computer for the host computer to synchronize execution of the application tasks by the host computer with the execution of application tasks in each of the plurality of other control nodes.

18 Claims, 3 Drawing Sheets

OTHER PUBLICATIONS

Kopetz, Hermann et al., "The Time-Triggered Ethernet (TTE) Design", "Object-Oriented Real-Time Distributed Computing, 2005. ISORC 2005. Eighth IEEE International Symposium on", May 18-20, 2005, pp. 22-33, Publisher: IEEE.

Stein Hammer, Klaus et al, "A Time-Triggered Ethernet (TTE) Switch", "Design, Automation and Test in Europe, 2006. Date '06. Proceedings", Mar. 6-10, 2006, pp. 1-6, vol. 1.

* cited by examiner

SYSTEM AND METHOD FOR A CROSS CHANNEL DATA LINK

BACKGROUND

Critical systems often require high levels of fault tolerance. For example, flight computers in aircraft (which are responsible for controlling certain operations of an aircraft during flight) are required to be fault tolerant. If a fault does occur in a fault-tolerant critical system, the system will continue to operate properly due to the fault tolerance. In order to achieve the required levels of fault tolerance, many systems incorporate redundancy into the network. For example, in some systems multiple redundant flight computers are used so that if one flight computer fails, the other redundant flight computers are able to continue controlling operation of the aircraft.

It is often necessary for the redundant computers to communicate so that at least a majority of the redundant computers agree on the output sent to other system components. Communication between the redundant flight computers is achieved through cross channel data links (CCDL) in some systems. The CCDL enables each redundant computer to transmit to and receive messages from each of the other redundant computers. In this way, the CCDL can be used to ensure that bad data from elsewhere in the system does not propagate and become the majority input to the redundant computers. Thus, the use of a CCDL includes multiple exchanges of data between the redundant computers, comparison and voting of input data, and selection of a majority opinion. In addition, the CCDL is used to synchronize the time base between the redundant computers so that each redundant computer is executing the same application task substantially simultaneously.

Although, the multiple exchanges of data and synchronization of time base enable the redundant computers to achieve the necessary fault tolerance, the fault tolerance comes at the expense of computer performance. Each of the redundant computers has to process all the exchanged data, which places an additional burden on the redundant computers.

SUMMARY

In one embodiment, a node is provided. The node comprises a host computer operable to execute application tasks and to transmit data; a local time-triggered Ethernet switch operable to enforce temporal constraints on time-triggered data; and a time-triggered Ethernet controller coupled to the local time-triggered Ethernet switch and operable to be coupled to a time-triggered Ethernet switch in each of a plurality of other control nodes. The time-triggered Ethernet controller is further operable to communicate with the plurality of other control nodes to synchronize a local clock to establish a global time base and to provide a signal to the host computer for the host computer to synchronize execution of the application tasks by the host computer with the execution of application tasks in each of the plurality of other control nodes.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1:
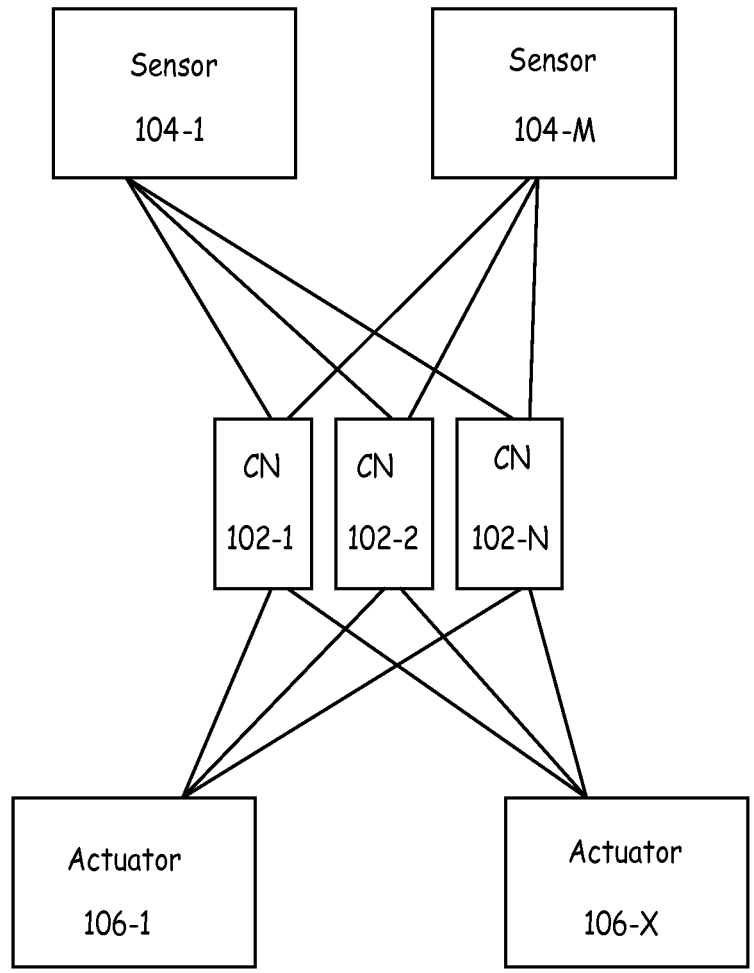
FIG. 1 is a block diagram of one embodiment of a network system.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures or the specification is not to be construed as limiting the order in which the individual steps may be performed. The following detailed description is, therefore, not to be taken in a limiting sense.

FIG. 1 is a block diagram of a network 100. Network 100 includes a plurality of control nodes 102-1 . . . 102-N, a plurality of sensors 104-1 . . . 104-M, and a plurality of actuators 106-1 . . . 106-X. Network 100 can be implemented, for example, in or as a critical system, such as an aircraft flight system or automotive system. In this embodiment, network 100 is implemented in an aircraft flight system and control nodes 102-1 . . . 102-N are redundant flight computers. Although an aircraft flight system is described in this exemplary embodiment, it is to be understood that in other embodiments, the techniques described here can be implemented in other systems, such as spacecraft, automotive, or other network systems. Each of control nodes 102-1 . . . 102-N is communicatively coupled to each of sensors 104-1 . . . 104-M. Sensors 104-1 . . . 104-M communicate data to each of control nodes 102-1 . . . 102-N, such as, but not limited to, aircraft heading, thrust, pitch, user input, etc.

Each of the control nodes 102-1 . . . 102-N are redundant. That is, each of the redundant control nodes 102-1 . . . 102-N, in the absence of any faults, should be in the same state at the application layer. Each of control nodes 102-1 . . . 102-N processes the data received from sensors 104-1 . . . 104-M. In addition, control nodes 102-1 . . . 102-N communicate with each other to prevent faulty data from propagating and becoming the majority as described in more detail below with respect to FIG. 2. Control nodes 102-1 . . . 102-N also transmit control signals based on the processed sensor data to actuators 106-1 . . . 106-X to control operation of the aircraft. For example, actuators 106-1 . . . 106-X can include, but are not limited to, wing flaps, engine thrust, etc.

Figure 2:
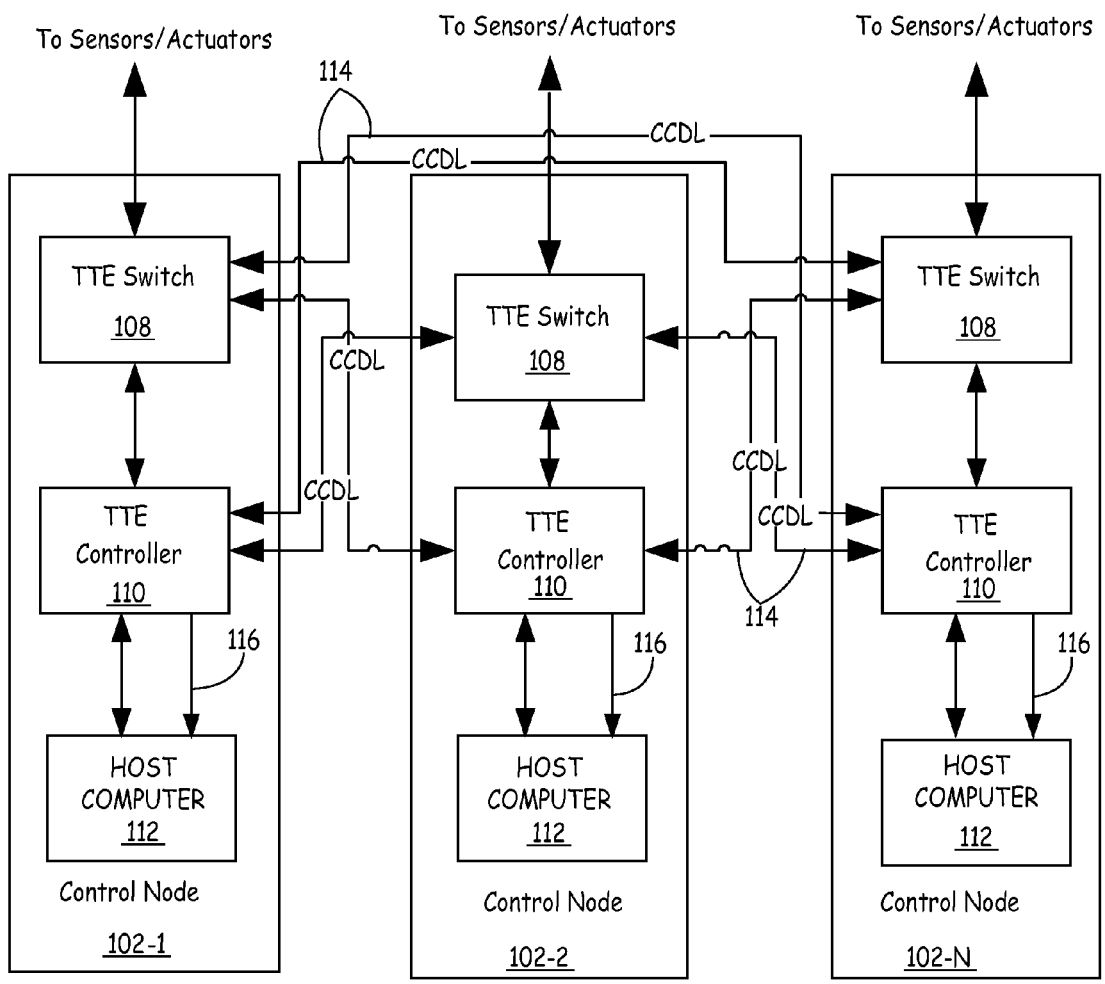
FIG. 2 is a block diagram of one embodiment of redundant control nodes coupled together via cross channel data links.

FIG. 2 is a more detailed block diagram of control nodes 102-1 . . . 102-N and the connections between them. As shown in FIG. 2, each control node 102 comprises a time-triggered Ethernet (TTE) switch 108, a time-triggered Ethernet (TTE) controller 110, and a host computer 112. In particular, in this embodiment, switch 108 is a gigabit time-triggered Ethernet switch and controller 110 is a time-triggered gigabit Ethernet controller. Additionally, in this embodiment, TTE controller 110 and TTE switch 108 are implemented as application specific integrated circuits (ASIC). However, it is to be understood that, in other embodiments, the TTe controller 110 and the TTE switch 108 are implemented in other ways (for example, using a field programmable gate array (FPGA)).

Time-triggered Ethernet is a communication architecture that supports both event-triggered and time-triggered traffic.

Typical Ethernet systems based on the IEEE 802.3 standard support only event-triggered traffic. That is, such event-triggered systems initiate an action, such as sending a message or executing a task, based on the occurrence of a non-temporal event. Time-triggered systems, however, initiate actions based on reaching a predetermined moment in a global time base. Additional details regarding time-triggered Ethernet can be found in H. Kopetz, et al., *The Time-Triggered Ethernet (TTE) Design*, in 8*th IEEE International Symposium on Object-oriented Real-time distributed Computing (ISORC)*, Seattle, Wash., May 2005; and Klaus Steinhammer et al., *A Time-Triggered Ethernet (TTE) Switch*, in *Design, Automation and Test in Europe*, Munich, Germany, Mar. 6-10, 2006, and collectively referred to here as the "TTE Papers." Each of the TTE Papers is hereby incorporated herein by reference.

A time-triggered Ethernet switch 108 can process both time-triggered and event-triggered traffic. For example, if both a time-triggered message and an event-triggered message are received at switch 108, switch 108 will forward the time-triggered message with a constant a priori known delay according to the timed transmission schedule. Time-triggered Ethernet switch 108 buffers the event-triggered message until it can be transmitted when no other time-triggered messages are being transmitted. Time-Triggered Ethernet switch 108 also enforces temporal constraints on time-triggered messages. For example, if a time-triggered message is received outside a valid receive window according to the transmission schedule, time-triggered Ethernet switch 108 discards the message.

Data from sensors 104 or actuators 106 received at each TTE switch 108 is broadcast over each cross channel data link (CCDL) 114. In this way, data received by one control node 102 is shared with the other control nodes 102. CCDL 114 are implemented as copper wires in this embodiment. However, it is to be understood that in other embodiments, other suitable media for communicating time-triggered Ethernet signals can be implemented, such as fiber optic cable.

Time-triggered Ethernet controller 110 buffers messages to be transmitted from the host computer 112 in order to transmit the messages according to the transmission schedule. Time-triggered Ethernet controller 110 in each control node 102 is also operable to synchronize the execution of application tasks on the respective host computer with the other host computers 112 using the global time base established by the TTE controller 110 for communications over the CCDL 114. As used herein, the term "application task" refers to a task executed by the host computer related to the primary function of the host computer. For example, application tasks for an aircraft flight computer are tasks related to the flying of the aircraft. In particular, each TTE controller 110 is coupled to the respective TTE switch 108 in each of control nodes 102-1 . . . 102-N via the plurality of CCDL links 114. Thus, each TTE controller 110 is coupled to the other TTE controllers 110 via three independent paths. The TTE controllers 110 in each control node 102 communicate with each other over the three independent paths to synchronize their respective local clocks to a global time base. In network 100, a global time base is established by the TTE controllers 110 and TTE switches 108 using the distributed clock synchronization mechanism described in the TTE Papers. Hence, a master clock is not used. Due to the redundant CCDL paths 114, each TTE controller 110 can synchronize its local clock to the global time base even if its local TTE switch 108 has failed.

As noted above, the host computers 112 synchronize the execution of the application tasks. In typical redundant systems, to perform such application synchronization, the host computers themselves must implement a clock synchronization mechanism to synchronize their local clocks such that host computers are executing application tasks substantially simultaneously. Typically, this is done by having the host computers exchange special messages that are used for such synchronization. However, in network 100, the TTE controllers 110 included in each control node 102 (as well as the TTE switches 108) already implement a clock synchronization mechanism that is used to synchronize the local clocks used by the TTE controllers 110 and the TTE switches 108 and establish a global time base for the purposes of communicating over the CCDL links 114. In this embodiment, this global time base that is established by the TTE controllers 110 and TTE switches 108 for communicating over the CCDL links 114 is also used to synchronize the execution of the application tasks by the host computers 112. As result, the host computers 112 need not implement a separate clock synchronization mechanism to establish a separate global time base for synchronizing the local clocks used by each of the host computers 112 in executing the application tasks. Instead, the global time base that is established by the TTE controllers 110 and TTE switches 108 for the purpose of communicating over the CCDL links 114 is also used by the host computers 112 as the global time base for synchronizing the execution of the application tasks.

In this embodiment, after the TTE controllers 110 and TTE switches 108 establish the global time base for the purpose of communication over the CCDL links 114, each TTE controller 110 then provides a synchronization signal to its respective host computer 112 to synchronize the execution of application tasks. For example, in one implementation of this embodiment, each TTE controller 110 periodically asserts an interrupt signal 116 based on the global time base established by the TTE controllers 110 and TTE switches 108 for the purpose of communicating over the CCDL links 114. Each host computer 112 uses the interrupt signal 116 to schedule the execution of the application tasks. Since the TTE controllers 110 are synchronized to their global time base and use this global time base to generate the interrupt signal 116, the execution of application tasks by each host computer 112 is also synchronized to that global time base. By synchronizing the execution of the application tasks by the host computers 112 in this way, less processing demand is placed on host computers 112, which frees more processing power to be used for important application tasks.

In addition, network 100 moves some fault detection functionality from host computers 112 to TTE controllers 110. As described above, in typical redundant systems, the host computers exchange data multiple times to identify and isolate faulty data. In particular, in a typical system having three redundant host computers, the host computers each receive three copies of data that is transmitted. Each host computer then compares the three copies to identify faults in the three copies. The host computers then exchange data again to communicate each host computers view of the message copies to guarantee fault tolerance.

However, in network 100, the exchange of data is simplified and the isolation of faults is performed in the TTE switches 108 and TTE controllers 110. For example, if a sensor 104 sends data to the control node 102 during a time slot in which it is scheduled to do so, switch 108 transmits a copy of that data to the TTE controller 110 in each of the control nodes 102 via the corresponding CCDL links 114. Similarly, each TTE controller 110 forwards copies of that data to the other control nodes 102 on each CCDL link 114. Each TTE switch 108 enforces temporal constraints on the received copies of data to discard data which is transmitted out of the corresponding window for that time slot.

In this embodiment, there are three redundant control nodes 102. That is, each of the redundant control nodes 102, in the absence of any faults, should be in the same state at the application layer. In this embodiment, the TTE communication processing performed by the TTE controllers 110 in each of the control nodes 102 presents to the respective host computer 112 in the control node 102 only a single copy of each data message that is transmitted in the network 100, even though multiple copies of each such data message are received at the respective TTE controller 110. Each TTE controller 110 is responsible for selecting the proper (that is, valid) copy of each such data message presented to the host computer 112.

For example, in the particular example shown in FIG. 2, for each data message transmitted in the network 110 to the control nodes 102, each TTE controller 110 receives three copies of the data message—one that is forwarded directly to it from its respective TTE switch 108 and two others that are forwarded from the TTE switches 108 of the other two control nodes 102. Each TTE controller 110 performs an error detection algorithm, such as a cyclic redundancy check (CRC) on the received copies of the data message. Each TTE controller 110 also verifies that the messages are valid. For example, each TTE controller 110 determines if it is valid for the source of the data message to have addressed it to the particular destination specified in the message (for example, based on the transmission schedule).

In this embodiment, each TTE controller 110 does not compare the data copies. Rather, each TTE controller 110 selects one of the three copies that passes an error detection algorithm and is a valid message. If only one copy is valid and passes the error detection algorithm, only that copy is selected. If more than one of the copies is valid and passes the error detection algorithm, each TTE controller 110 selects only one copy based on an a priori scheme. For example, in some embodiments, a default order of the CCDL links 114 is used to select the copy. Each TTE controller 110 then forwards only the selected copy of the data to the respective host computer 112. Thus, the host computer 112 need not analyze and compare multiple copies of data to identify faults, which further reduces the processing burden on host computer 112. Thus, by leveraging the TTE architecture, network 100 is able to move synchronization and fault isolation functionality from the host computer 112 to the TTE controller 110 and TTE switch 108, which frees more processing power for application tasks executed by the host computer 112.

Figure 3:
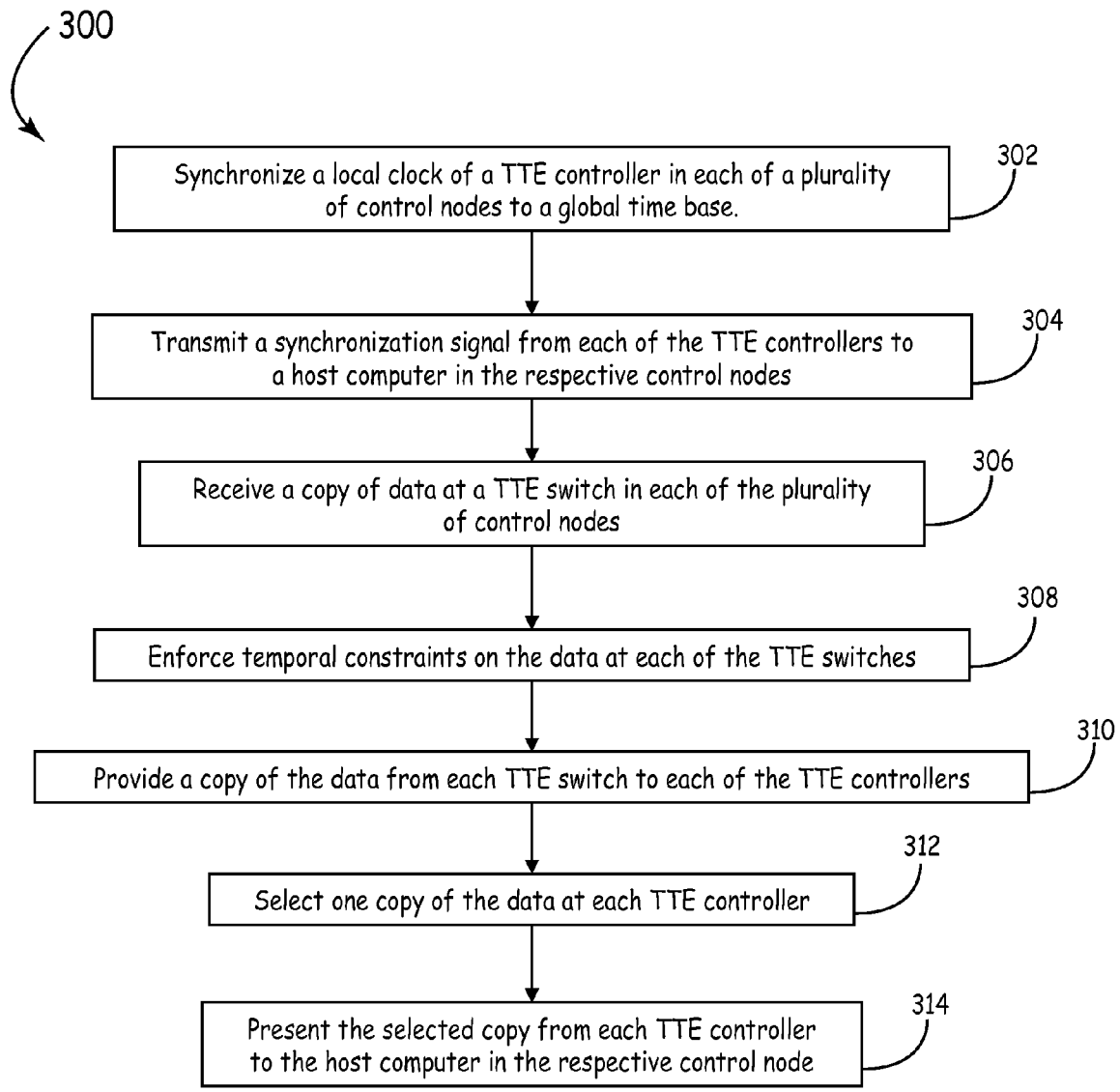
FIG. 3 is a flow chart depicting one embodiment of a method of communicating in a network.

FIG. 3 is a flow chart depicting one embodiment of a method 300 of communicating in a network. Method 300 is described here as being implemented in network 100 of FIGS. 1 and 2. At 302, a TTE controller 110 in each of a plurality of control nodes periodically communicates with the TTE controllers 110 in the other control nodes and the TTE switches 108 to synchronize their local clocks and establish a global time base. At 304, each TTE controller 110 transmits a synchronization signal to a respective host computer 112 in the respective control node 102 in order to synchronize the execution of application tasks by the plurality of host computers 112. In particular, the synchronization signal establishes the time base for the host computer 112. In this embodiment, the synchronization signal is an interrupt signal.

At 306, a copy of a message is received at a TTE switch 108 in each of the plurality of control nodes 102. At 308, each TTE switch 108 enforces temporal constraints on the received message using the global time base. The received message can be data received from any component coupled to the TTE switch 108, such as a TTE controller 110 in one of the control nodes 102, a sensor 104, or an actuator 106. At 310, each TTE switch 108 provides a copy of the received message to a TTE controller 110 in each of the control nodes 102 via a plurality of cross channel data links 114. Thus, each TTE controller 110 receives a plurality of copies of the message.

At 312, each TTE controller 110 selects one of the plurality of received copies of the message. In particular, each TTE controller 110 performs an error detection algorithm on each copy and verifies that each copy of the message is valid. Each TTE controller 110 then selects a message copy which passes the error detection algorithm (a healthy copy) and is valid. If more than one copy is healthy and valid, each TTE controller 110 selects one of the copies based on a pre-determined scheme. At 314, each TTE controller 110 forwards only the selected copy of the message to a host computer 112 in the respective control node 102 for processing.

TTE controller 110, TTE switch and/or host computer 112 can be implemented using software, firmware, hardware, or any appropriate combination thereof, as known to one of skill in the art. By way of example and not by way of limitation, these hardware components can include one or more microprocessors, memory elements, digital signal processing elements, look-up tables, interface cards, and other standard components known in the art. Any of the foregoing may be supplemented by, or incorporated in, specially-designed application-specific integrated circuits (ASIC) and field programmable gate arrays (FPGA). In some embodiments, TTE controller 110, TTE switch and/or host computer 112 includes or functions with software programs, firmware or computer readable instructions for carrying out various methods, process tasks, calculations, and control functions, used in the processing functions described above, such as synchronization of local clocks to a global time base. These instructions are typically tangibly embodied on any appropriate medium used for storage of computer readable instructions or data structures.

The medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A control node comprising:
   a host computer operable to execute application tasks and to transmit data;
   a local time-triggered Ethernet switch operable to enforce temporal constraints on time-triggered data;
   and a time-triggered Ethernet controller coupled to the local time-triggered Ethernet switch and operable to be coupled to a time-triggered Ethernet switch in each of a plurality of other control nodes;

wherein the time-triggered Ethernet controller is further operable to communicate with the plurality of other control nodes to synchronize a local clock to establish a global time base, provide a signal to the host computer for the host computer to synchronize execution of the application tasks by the host computer with the execution of application tasks in each of the plurality of other control nodes, and receive a copy of data via each of the local time-triggered Ethernet switch and the time-triggered Ethernet switch in each of the plurality of other control nodes and to select one of the plurality of received copies of data to present to the host computer;

wherein each control node has a separate local time-triggered Ethernet switch.

2. The control node of claim 1, wherein the time-triggered Ethernet controller is operable to select a received copy that has passed an error detection algorithm and is determined to be valid for the time-triggered Ethernet controller.

3. The control node of claim 2, wherein if more than one of the received copies of data passed the error detection algorithm and is valid, the time-triggered Ethernet controller is operable to select one of the received copies based on a pre-determined scheme.

4. The control node of claim 1, wherein the signal provided to the host computer from the time-triggered Ethernet controller is an interrupt signals.

5. The control node of claim 1, wherein the time-triggered Ethernet switch is a gigabit time-triggered Ethernet switch and the time-triggered Ethernet controller is a gigabit time-triggered Ethernet controller.

6. A vehicle network for a vehicle comprising:
a plurality of sensors operable to obtain data relating to the vehicle;
a plurality of control nodes, each coupled to each of the plurality of sensors;
wherein each of the control nodes is operable to process the data obtained by the plurality of sensors and to output control signals based on the processed sensor data;
a plurality of actuators coupled to each of the plurality of control nodes to receive the control signals and operable to adjust operation of the vehicle based on the control signals;
and wherein each of the control nodes comprises:
a host computer operable to execute application tasks to process the sensor data and to generate the control signals;
a separate local time-triggered Ethernet switch operable to enforce temporal constraints on time-triggered data;
and a time-triggered Ethernet controller coupled to the local time-triggered Ethernet switch, the time-triggered Ethernet controller also coupled to the time-triggered Ethernet switch in each of the plurality of control nodes via a plurality of cross channel data links;
wherein the time-triggered Ethernet controller is operable to communicate with the plurality of other control nodes via the plurality of cross channel data links to synchronize a local clock to establish a global time base, provide a synchronization signal to the host computer to synchronize execution of the application tasks by the host computer with the execution of application tasks in each of the plurality of other control nodes, and to receive a copy of data via each of the local time-triggered Ethernet switch and the time-triggered Ethernet switch in each of the plurality of other control nodes and to select one of the plurality of received copies of data to present to the host computer.

7. The network of claim 6, wherein the time-triggered Ethernet controller in each of the control nodes is operable to select a received copy that has passed an error detection algorithm and is determined to be valid for the time-triggered Ethernet controller.

8. The network of claim 7, wherein if more than one of the received copies of data passed the error detection algorithm and is valid, the time-triggered Ethernet controller in each of the control nodes is operable to select one of the received copies based on a pre-determined scheme.

9. The network of claim 6, wherein the synchronization signal provided to the host computer in each of the control nodes from the respective time-triggered Ethernet controller is an interrupt signal.

10. The network of claim 6, wherein the time-triggered Ethernet switch in each of the control nodes is a time-triggered gigabit Ethernet switch and the time-triggered Ethernet controller in each of the control nodes is a time-triggered gigabit Ethernet controller.

11. The network of claim 6, wherein the control nodes are flight computers in an aircraft.

12. The network of claim 6, wherein the plurality of cross channel data links comprise copper cables.

13. The network of claim 6, wherein the plurality of control nodes comprises three control nodes.

14. A method of communicating in a network, the method comprising:
enforcing temporal constraints on data received at a time-triggered Ethernet (TTE) switch in each of a plurality of control nodes;
providing a copy of the data received from each of the TTE switches to a TTE controller in each of the plurality of control nodes via a plurality of cross channel data links (CCDL) such that each TTE controller receives a plurality of copies of the received data;
selecting, at the TTE controller in each of the plurality of control nodes, one of the plurality of copies; and
presenting the selected copy from the TTE controller in each of the plurality of control nodes to a host computer in the same control node as the respective TTE controller,
wherein each control node has a separate local TTE switch.

15. The method of claim 14, further comprising:
synchronizing a local clock in each of the TTE controllers to establish a global time base; and
outputting a synchronization signal from each of the TTE controllers to the host computer in the same control node to establish a time base for the host computer in each of the control nodes.

16. The method of claim 15, wherein outputting the synchronization signal comprises generating an interrupt signal.

17. The method of claim 14, wherein selecting one of the plurality of copies comprises:
executing an error detection algorithm on each of the plurality of copies;
verifying that each copy is valid for the TTE controller that received the copy; and
selecting a copy that passes the error detection algorithm and is valid for the TTE controller.

18. The method of claim 17, wherein, if more than one of the plurality of copies passes the error detection algorithm and is valid, selecting the copy comprises selecting the copy based on a pre-determined scheme.

* * * * *